Nov. 30, 1948.
C. G. BRANSTRATOR
2,455,293
DOOR FOR VEHICLES
Filed July 21, 1947
2 Sheets-Sheet 1
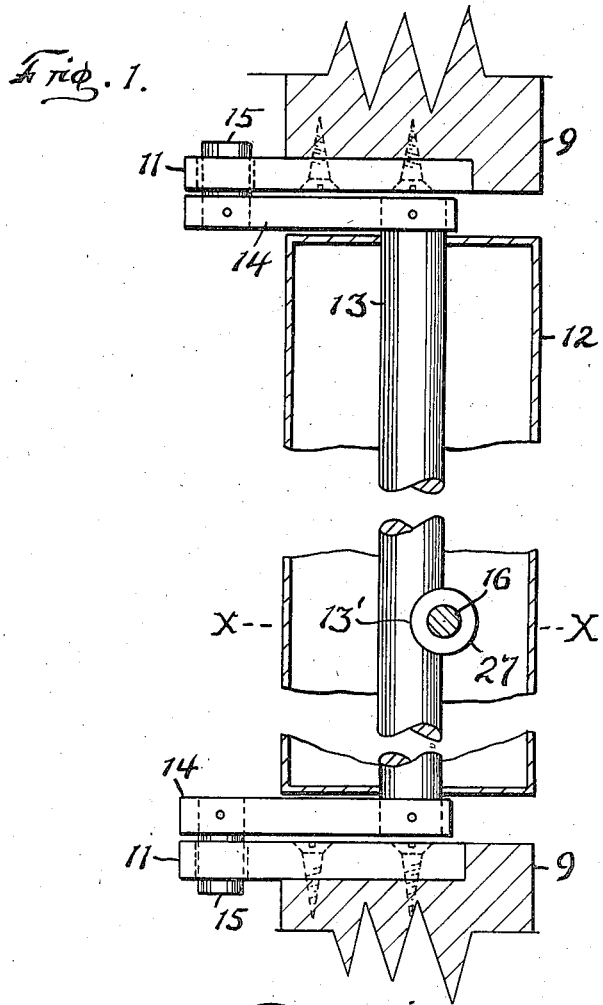
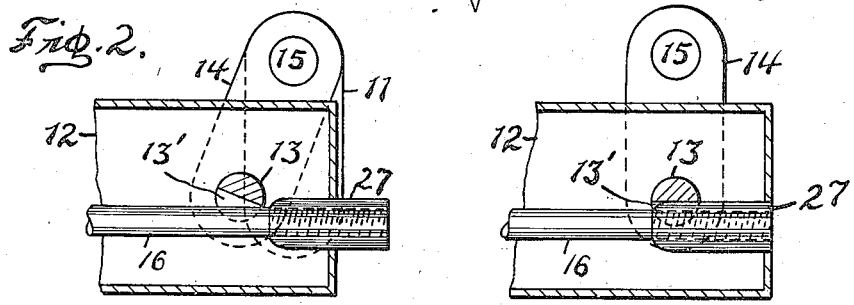
INVENTOR.
Clem G. Branstrator
BY
A. G. Burns
Attorney.

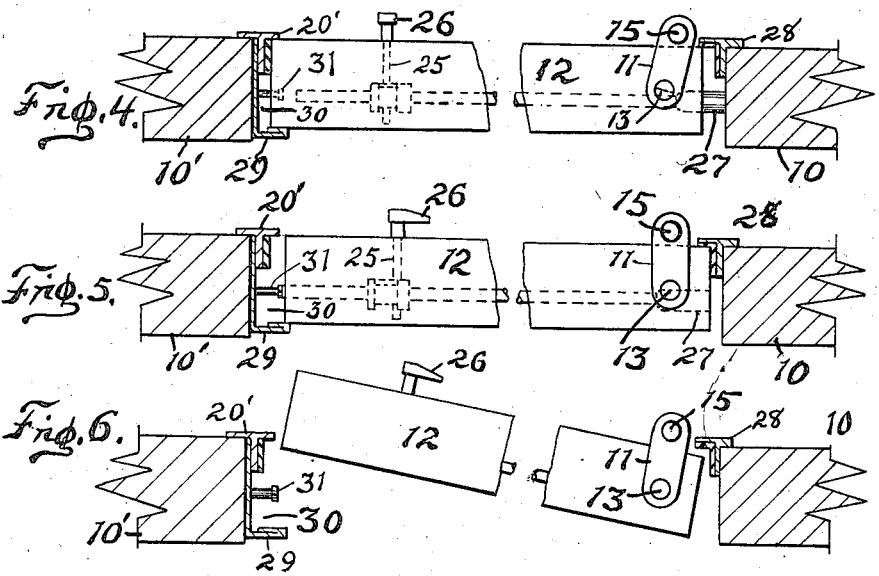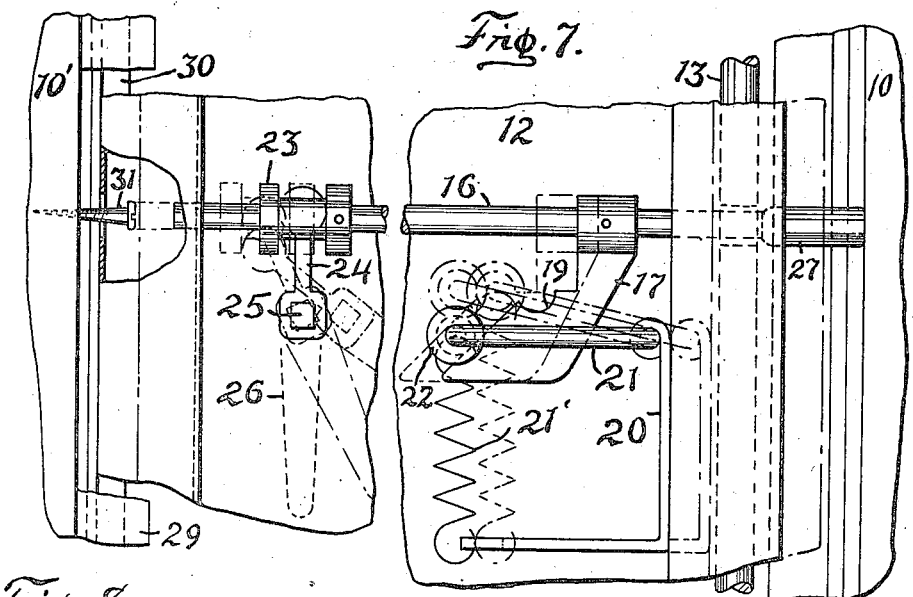

Patented Nov. 30, 1948

2,455,293

UNITED STATES PATENT OFFICE 2,455,293

DOOR FOR VEHICLES

Clem G. Branstrator, Fort Wayne, Ind.

Application July 21, 1947, Serial No. 762,244

6 Claims. (Cl. 296—44)

This invention relates to improvements in doors for vehicles such as automobile trailers and the like.

Ordinarily, automobile and trailer doors are hinged along one side thereof to an adjacent door jamb and are secured to the opposite door jamb by a latching or locking mechanism.

An object of the instant invention is to provide a door that has hinged connection at one of its sides with a door frame, and interlocking connection with the opposite side of the door frame when in one selected position, and is removable therefrom when moved to another selected position, thus to permit swinging the door open upon its hinge supports.

Another object of the invention is to afford a door structure in which a door is hingedly supported in a door frame, at one side thereof, and movable into interlocking engagement with the opposite side of the door frame after the door is closed.

And a further object of the invention is to provide simple mechanism by which to move the door into interlocking engagement with the door frame and secure it in place therein.

Other objects and advantages of the invention appear in the following description.

An illustrative embodiment of the invention is shown in the accompanying drawings, in which:

Fig. 1 is an elevational view showing a transverse section of the door and door frame, and hinge parts therefor;

Figs. 2 and 3 are fragmentary detail views of the hinged end of the door showing locking mechanism for the hinge members in opposite positions, parts being in section on the line x—x of Fig. 1.

Fig. 4 is a top plan view of the door and door frame with the door in latched position, parts being in section;

Fig. 5 is a similar view showing the door in unlocked position in readiness to be opened;

Fig. 6 is another similar view showing the door open;

Fig. 7 is a fragmentary elevational view of the door frame and the door closed and in locked position, viewed from the interior of the vehicle; and Fig. 8 is a detail view of a cam bracket for a detent device.

The illustrative embodiment of the invention consists of a door frame 9 having opposing door jambs 10—10'. In the frame at the top and bottom thereof are secured laterally extending perforated hinge brackets 11, and in the door 12 is disposed a vertical oscillating shaft 13. Upon the upper and lower ends of the oscillating shaft are secured laterally extending arms 14 provided with pintles 15 that extend through the corresponding hinge brackets 11 arranged so that the door has swinging movement thereon.

In the door 12 is mounted a horizontal jamb shaft 16 having longitudinal movement therein, and on said shaft is secured a cam bracket 17 having an upwardly inclined face 18 and a notch 19 adjacent the upper end of said face. Upon the door is secured an angular bracket 20 on which is pivotally mounted a detent device consisting of an arm 21 provided with a roller 22 that rides upon the face 18 or engages in the notch 19, selectively according to the position of the cam bracket 17, whereby the jamb shaft 16 is detained when moved to its forward position. A retracting spring 21' has connection at its ends with the arm 21 and the bracket 20 whereby pressure of the roller 22 against the cam bracket is exerted. Also, there is secured on the jamb shaft a flanged sleeve 23 that has operative engagement with an activating lever 24 mounted upon a turn-bolt 25 that extends through the door and is provided with operating handles 26 on its ends.

The oscillating shaft 13 has in one side thereof a recess 13', and the jamb shaft 16 has threaded on its rear end a lock lug 27 that enters the recess 13' (Fig. 3) when the door is moved back into position for opening, which prevents the door from turning relative to the oscillating shaft (Fig. 5). When the oscillating shaft is thus locked the door swings upon the axes of the pintles 15.

The door jamb 10 is provided with a cushioned weather-strip 28 that overlaps the adjacent outer face of the door, and the opposite jamb 10' has secured to its inner face a channel strip 29 including another cushioned weather-strip 20' that forms a pocket 30 into which the corresponding side of the door 12 enters when closed and moved into locked position.

Projecting from the jamb 10', through the channel strip 29 into the pocket 30, is a stop 31 by which the forward thrust of the jamb shaft is limited. The back thrust of the jamb shaft is limited by contact of the lug 27 with the other door jamb 10. The stop is threaded in the door jamb 10', and the lug 27, being threaded on the jamb shaft, afford means of adjustment by which endwise stroke of the jamb shaft is varied.

Operation

In use, the door is closed and locked, or unlocked and opened by manipulation of the operating handle 26. When in closed and locked position (Figs. 4—7), the door is supported by the hinge brackets 11, and is spaced suitably distant from the adjacent face of the door jamb 10 so as to afford limited lateral play of the door between the jambs, and the opposite side of the door projects into the pocket 30 of the channel strip where it is held due to pressure of the lug 27 against the jamb 10 and the detent mechanism, thus preventing the door from swinging open. In opening the door, the handle 26 is swung backwardly partway from its normal (preferably vertical) position, thus causing forward axial movement of the jamb shaft into contact with the stop 31, after which upon further back swinging of the operating handle the door is bodily moved backward so that its free end is removed from the pocket 30, and coincidentally the lug 27 is moved into the recess 13' in the oscillating shaft 13, thereby preventing relative movement of the door and oscillating shaft. The door is then swung open upon the axes of the pintles 15. The purpose of providing turning movement of the oscillating shaft in the door is to permit forward and backward movement of the door in the door frame, accordingly as the operating handle is turned, to free the door from the pocket or interpose it therein, and thus permit or prevent swinging the door open upon its hinge supports.

In Figs. 2, 4, and 7 the parts are shown as when the door is closed and locked.

In opening the door, the operating handle is turned backwardly, partway, causing forward movement of the jamb shaft into contact with the stop 31, the turn-bolt 25 then serving as a fulcrum for the handle 26 and activating lever 24. Upon further backward movement of the handle, the flanged sleeve 23 becomes the fulcrum, whereupon the door slides backwardly out of the pocket 30, and the oscillating shaft 13, coincidentally, is moved into locked engagement with the lug 27 (Fig. 3), so the door, when swung to open position, has hinged movement upon the pintles 15, the several movements being sequential: First, the forward thrust of the jamb shaft into contact with the stop; second, the backward movement of the door and engagement of the roller 22 of the detent mechanism with the notch 19 in the cam bracket 17; and third, the hinged movement of the door upon the pintles 15 into full open position, all of which movements are accomplished by manipulation of the operating handle. In closing and locking the door, from open position, the door is first, swung upon its hinge supports into the door opening; second, the handle is swung forwardly, causing backward movement of the jamb shaft 16, so the lug 27 is moved out of locking engagement with the oscillating shaft 13 (Fig. 2) into contact with the adjacent wall of the door jamb 10; (Figs. 4—7) and third, forward movement of the door into the pocket 30, thus causing interlocking of the door with the channel strip, and consequent prevention of outward swinging of the door.

Variations from the particular construction disclosed may be resorted to by the exercise of skill in the art, without departure from the spirit or scope of the invention.

What I claim is:

1. A vehicle door structure consisting of a door frame having upper and lower outwardly extending hinge brackets adjacent one of the door jambs and a channel strip on the opposing face of the other door jamb, a door having mounted therein a vertical oscillating shaft provided with a recess in one side thereof and arms secured on its ends connected with said hinge brackets, a horizontal jamb shaft mounted in said door for axial movement therein, provided with a lug on one of its ends having locking engagement with said oscillating shaft and adapted to contact the adjacent door jamb, a spring-restrained detent mechanism, operatively connecting the door and the jamb shaft, to restrain relative movement thereof, a sleeve secured on the jamb shaft, actuating mechanism consisting of a turn-bolt, mounted in the door provided at its ends with operating handles and an activating arm engaged with said sleeve, adapted to selectively move the jamb shaft or the door in opposite directions, and a stop on said other door jamb engageable with said jamb shaft to limit forward movement thereof.

2. In a door for vehicles, a door frame having outwardly extending hinge brackets located adjacent one of the door jambs, a door having an oscillating shaft provided with outwardly extending arms pivoted on said brackets to support the door, a horizontal jamb shaft axially movable in said door, a lug on one end of said jamb shaft having locking engagement with said oscillating shaft when moved to a selected position and contact with said door jamb when the jamb shaft is moved to another selected position to limit movement of said jamb shaft in one direction, a stop extending from the other door jamb adapted to be contacted by said jamb shaft and limit movement thereof in the opposite direction, a channel strip on said other door jamb adapted to receive the corresponding end of said door to prevent opening of the door, a detent mechanism connecting the door and said jamb shaft to restrain relative movement thereof when the door is open, and operating mechanism carried by the door and operatively connected with said jamb shaft adapted to impart axial movement to said jamb shaft and said door sequentially in opposite directions, thus to permit or prevent opening of the door accordingly as the operating mechanism is manipulated.

3. A vehicle door structure consisting of a door frame having hinge brackets thereon adjacent one of its door jambs, an oscillating shaft having arms hingedly connected with said brackets, a door supported loosely on said oscillating shaft, a jamb shaft axially movable in said door provided at one end with a lug that has locking engagement with said oscillating shaft and contact with the adjacent door jamb when in a selected position and the door is closed, the opposite door jamb having a pocket adapted to receive the corresponding side of the door, a stop on said other door jamb adapted to have contact with said jamb shaft to limit forward thrust thereof, a spring-loaded detent mechanism in connection with the door and said jamb shaft adapted to restrain or urge relative movement thereof accordingly as positioned, and operating mechanism carried by the door and connected with said jamb shaft adapted to impart movement to said jamb shaft and said door sequentially in opposite directions, thus to permit or prevent opening of the door accordingly as the operating mechanism is manipulated.

4. A vehicle door structure in which is included a door frame having opposite door jambs, one of said jambs having therein a pocket and the opposite jamb having hinge brackets, an oscillating shaft having arms hinged to said brackets, a door supported on said shaft adapted to turn thereon, a horizontal jamb shaft, axially movable in said door, and having, when the door is closed, longitudinal play between the door jambs, said jamb shaft having locking engagement with said oscillating shaft, when said door is disposed in the door frame, to prevent turning of said oscillating shaft in the door when said jamb shaft is in a selected position therein, operating mechanism provided with a handle and an arm connected with said jamb shaft, the arrangement being such that by manipulation of the handle, the jamb shaft and the door are moved sequentially in opposite directions, thus to lock the door in said door frame after the door is closed, and a spring-loaded detent mechanism connecting the door and jamb shaft to restrain or urge relative movement thereof accordingly as said handle is manipulated.

5. A door structure for a vehicle consisting of a door frame, one side of said frame having a pocket and the opposite side of the frame having hinge brackets, a door having in one side thereof an oscillating shaft provided with arms hingedly connected with said brackets, a horizontal jamb shaft element longitudinally movable in said door having locking engagement with said oscillating shaft to prevent turning movement thereof in the door when the door is moved into position in the door frame for opening of the door, an operating mechanism carried by the door, including a handle and an activating arm engaged with said jamb shaft, whereby the jamb shaft element and the door are moved sequentially in opposite directions so said element contacts one of said jambs while the door enters the pocket of the other jamb, and a spring-loaded detent mechanism connecting said door and jamb shaft element to urge or deter relative movement thereof accordingly as positioned.

6. A vehicle door structure consisting of a door frame provided with a pocket in one of its jambs and hinge brackets adjacent the opposite jamb, an oscillating shaft having arms hingedly connected to said brackets, a door hingedly connected at one side thereof on said oscillating shaft, the opposite end of the door being movable into said pocket or withdrawn therefrom accordingly as the door is shifted sidewise in the door frame, a horizontal jamb shaft supported and longitudinally movable in the door having limited play between the door jambs when the door is disposed therebetween, said jamb shaft having locking engagement with said oscillating shaft when the door is moved in said frame to position for opening, operating mechanism carried by the door and connected with said jamb shaft by which said jamb shaft and the door are moved sequentially in opposite directions accordingly as the operating mechanism is manipulated, and a detent device connecting the jamb shaft and the door to hold the door in position to be opened.

CLEM G. BRANSTRATOR.

No references cited.